United States Patent
Nakata

(10) Patent No.: US 9,100,848 B2
(45) Date of Patent: Aug. 4, 2015

(54) FREQUENCY DETERMINATION FOR BASE STATIONS INSTALLED IN DIFFERENT LOCATIONS UNDER DIFFERENT OPERATORS

(75) Inventor: Atsushi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

(21) Appl. No.: 13/822,268

(22) PCT Filed: Jun. 14, 2011

(86) PCT No.: PCT/JP2011/003369
§ 371 (c)(1),
(2), (4) Date: Mar. 11, 2013

(87) PCT Pub. No.: WO2012/035686
PCT Pub. Date: Mar. 22, 2012

(65) Prior Publication Data
US 2013/0171984 A1    Jul. 4, 2013

(30) Foreign Application Priority Data
Sep. 17, 2010    (JP) .................................. 2010-208927

(51) Int. Cl.
*H04W 4/00*    (2009.01)
*H04W 40/00*    (2009.01)
(Continued)

(52) U.S. Cl.
CPC .............. *H04W 24/02* (2013.01); *H04W 16/16* (2013.01)

(58) Field of Classification Search
CPC ... H04W 16/16; H04W 88/12; H04W 72/044; H04W 72/0453; H04W 74/0866; H04W 72/04; H04W 8/02; H04W 8/06; H04W 60/00; H04W 60/04; H04W 72/06; H04L 29/08648
USPC ........ 455/421, 422.1, 423–425, 432.1–432.3, 455/435.1–435.3, 436–440, 450, 456.1, 455/456.5, 524–525, 550.1, 551, 552.1, 455/560–561, 418–420, 433–434, 455/435.1–435.2, 444–447, 452.1–452.2, 455/456.3; 370/310, 328–329, 338, 341
See application file for complete search history.

(56) References Cited

U.S. PATENT DOCUMENTS 6,498,936 B1 * 12/2002 Raith ............................ 455/466
6,801,772 B1 * 10/2004 Townend et al. .............. 455/436
(Continued)

FOREIGN PATENT DOCUMENTS

JP    2009-302926 A    12/2009
WO    WO 2009/047972 A1    4/2006
(Continued)

*Primary Examiner* — Meless Zewdu
(74) *Attorney, Agent, or Firm* — Foley & Lardner LLP

(57) ABSTRACT

A location judgment unit (411) judges whether an installation location of a base station (10) is in a first area corresponding to a service area of a first network operator. A frequency determination unit (412) determines, by using a first procedure, a radio frequency for use in wireless communication between the base station (10) and a mobile station (30) when the installation location of the base station (10) is in the first area, and determines the radio frequency of the base station (10) by using a second procedure different from the first procedure when the installation location of the base station (10) is outside the first area. The second procedure includes: receiving information on a frequency available in the installation location of the base station (10) from a frequency management system (50) that manages a frequency of a second area including the installation location of the base station (10); and determining a radio frequency of the base station (10) based on the frequency information.

20 Claims, 12 Drawing Sheets

(51) Int. Cl.
*H04B 7/00* (2006.01)
*H04B 1/38* (2006.01)
*H04W 24/02* (2009.01)
*H04W 16/16* (2009.01)

(56) References Cited

U.S. PATENT DOCUMENTS

| | | | |
|---|---|---|---|
| 6,904,026 B1* | 6/2005 | Tarnanen et al. | 370/329 |
| 2004/0072578 A1* | 4/2004 | Keutmann et al. | 455/456.1 |
| 2004/0105429 A1* | 6/2004 | Anckar et al. | 370/352 |
| 2004/0152462 A1* | 8/2004 | Hwang | 455/432.1 |
| 2004/0185808 A1* | 9/2004 | Chow | 455/127.2 |
| 2004/0223477 A1* | 11/2004 | Iwasaki et al. | 370/338 |
| 2004/0228267 A1* | 11/2004 | Agrawal et al. | 370/203 |
| 2006/0094353 A1* | 5/2006 | Nielsen et al. | 455/17 |
| 2006/0178144 A1* | 8/2006 | Kuroda | 455/432.1 |
| 2006/0188003 A1* | 8/2006 | Larsson | 375/130 |
| 2006/0246890 A1* | 11/2006 | Yasuda et al. | 455/425 |
| 2006/0293076 A1* | 12/2006 | Julian et al. | 455/522 |
| 2007/0142055 A1* | 6/2007 | Toivanen et al. | 455/450 |
| 2008/0070565 A1 | 3/2008 | Maeda | |
| 2008/0186904 A1* | 8/2008 | Koyama et al. | 370/320 |
| 2009/0132746 A1* | 5/2009 | Tom | 710/300 |
| 2009/0286466 A1* | 11/2009 | Kim et al. | 455/3.02 |
| 2010/0099406 A1* | 4/2010 | Anantharaman et al. | 455/434 |
| 2010/0167755 A1* | 7/2010 | Kim et al. | 455/456.1 |
| 2010/0240386 A1 | 9/2010 | Hamabe et al. | |
| 2010/0248735 A1 | 9/2010 | Hamabe et al. | |
| 2011/0009132 A1* | 1/2011 | Skarby et al. | 455/456.5 |
| 2011/0149862 A1 | 6/2011 | Hosono | |
| 2011/0263248 A1* | 10/2011 | Tsui | 455/432.1 |

FOREIGN PATENT DOCUMENTS

| WO | WO 2006/054341 A1 | 5/2006 |
|---|---|---|
| WO | WO 2009/044620 A1 | 4/2009 |
| WO | WO 2009/148126 A1 | 12/2009 |

* cited by examiner

FREQUENCY DETERMINATION FOR BASE STATIONS INSTALLED IN DIFFERENT LOCATIONS UNDER DIFFERENT OPERATORS

This application is the National Phase of PCT/JP2011/003369, filed Jun. 14, 2011, which claims priority to Japanese Application No. 2010-208927, filed Sep. 17, 2010, the disclosures of which are hereby incorporated by reference in their entirety.

TECHNICAL FIELD

The present invention relates to determination of a frequency used by a radio base station.

BACKGROUND ART

Small radio base stations installable in a user' house, office, or the like have been developed (see Patent Literatures 1 and 2, for example). Such a small radio base station is installed in a house, a small office, or the like by a user who owns the small radio base station, and is connected to an upper-level device on the side of a core network via an IP (Internet Protocol) communication network, such as the Internet, by using ADSL (Asymmetric Digital Subscriber Line) or an optical fiber line.

Such a small radio base station is generally called a femto base station, a femtocell base station, or a home base station. The size (coverage area) of a cell formed by a small radio base station is typically about several meters to several tens of meters, which is extremely smaller than that of a macro cell of the related art. For this reason, a cell formed by a small radio base station is called a femtocell, a home cell, or the like. The 3GPP (Third Generation Partnership Project) defines such a small radio base station as Home Node B (HNB) and Home evolved Node B (HeNB), and is proceeding with standardization work. The term "HNB" refers to a small radio base station for UTRAN (UMTS (Universal Mobile Telecommunications System) Terrestrial Radio Access Network). The term "HeNB" refers to a small radio base station for LTE (Long Term Evolution)/E-UTRAN (Evolved UTRAN).

CITATION LIST

Patent Literature

[Patent Literature 1] International Patent Publication No. WO 2009/047972
[Patent Literature 2] International Patent Publication No. WO 2009/044620

SUMMARY OF INVENTION

Technical Problem

Femtocell base stations are small and easy to carry. For this reason, femtocell base stations provided from Japanese network operators can be brought into other countries, for example. In this case, however, the available frequency band and the use conditions therefor (available time, transmission power, and the like) are different from country to country. For example, radio frequencies reserved for IMT-2000 include approximately 20 frequency bands as shown in Section 5.2 Table 5.0 of 3GPP TS25.104 V9.2.0 (issued in December 2010). Further, which frequency band is used by which network operator of which country as a licensed band is specified in a law or the like related to the utilization of radio waves determined by a radio frequency management authority in each country.

Accordingly, when a femtocell base station can be used also in a foreign country, it is necessary for a femtocell base station to determine a radio frequency for use in wireless communication with a mobile station according to radio frequencies available in a destination foreign country, use conditions for frequencies, and a law or the like related to radio waves in the foreign country. However, there has been no proposal for a system that allows a femtocell base station to acquire information on these radio frequencies in the foreign country. Therefore, a femtocell base station available in a certain country is not generally permitted to be used in foreign countries. As a result, a user visiting a foreign country needs to connect a mobile station to a network of a foreign network operator where the user stays, and needs to pay high international roaming charges.

The present invention has been made based on the above-described findings by the present inventors, and it is an object of the invention to provide a wireless communication control system, a radio base station, a frequency determination method, and a program, which are capable of setting up a radio frequency adaptable to an installation location of a radio base station, when the radio base station, such as a femtocell base station, is installed outside a predetermined installable area (for example, a service area of a network operator).

Solution to Problem

A first aspect of the present invention includes a wireless communication control system. The wireless communication control system includes a judgment unit and a frequency determination unit. The judgment unit judges whether an installation location of a radio base station is in a first area corresponding to a service area of a first network operator. The frequency determination unit determines, by using a first procedure, a radio frequency for use in wireless communication between the radio base station and a mobile station when the installation location is in the first area, and determines the radio frequency by using a second procedure different from the first procedure when the installation location is outside the first area. The second procedure includes: receiving, from a frequency management system that manages a frequency of a second area being outside the first area and including the installation location, information on a frequency available in the installation location; and determining the radio frequency based on the frequency information.

A second aspect of the present invention includes a radio base station that performs wireless communication with a mobile station. The radio base station includes a judgment unit and a frequency determination unit. The judgment unit judges whether an installation location of the radio base station is in a first area corresponding to a service area of a first network operator. The frequency determination unit determines, by using a first procedure, a radio frequency for use in wireless communication with the mobile station when the installation location is in the first area, and determines the radio frequency by using a second procedure different from the first procedure when the installation location is outside the first area. The second procedure includes: receiving, from a frequency management system that manages a frequency of a second area being outside the first area and including the installation location, information on a frequency available in the installation location; and determining the radio frequency based on the frequency information.

A third aspect of the present invention includes a method for determining a frequency used by a radio base station for wireless communication with a mobile station. The method includes the following steps:

(a) judging whether an installation location of the radio base station is in a first area corresponding to a service area of a first network operator; and (b) determining, by using a first procedure, a radio frequency for use in wireless communication with the mobile station when the installation location is in the first area, and determining the radio frequency by using a second procedure different from the first procedure when the installation location is outside the first area.

Further, the second procedure includes: receiving, from a frequency management system that manages a frequency of a second area being outside the first area and including the installation location, information on a frequency available in the installation location; and determining the radio frequency based on the frequency information.

A program according to a fourth aspect of the present invention is a program for causing a computer to execute the method according to the third aspect of the present invention.

Advantageous Effects of Invention

According to the aspects of the present invention described above, it is possible to provide a wireless communication control system, a radio base station, a frequency determination method, and a program, which are capable of setting up a radio frequency adaptable to an installation location of a radio base station, when the radio base station such as a femtocell base station is installed outside a predetermined installable area (for example, a service area of a network operator).

DESCRIPTION OF EMBODIMENTS

Figure 1:
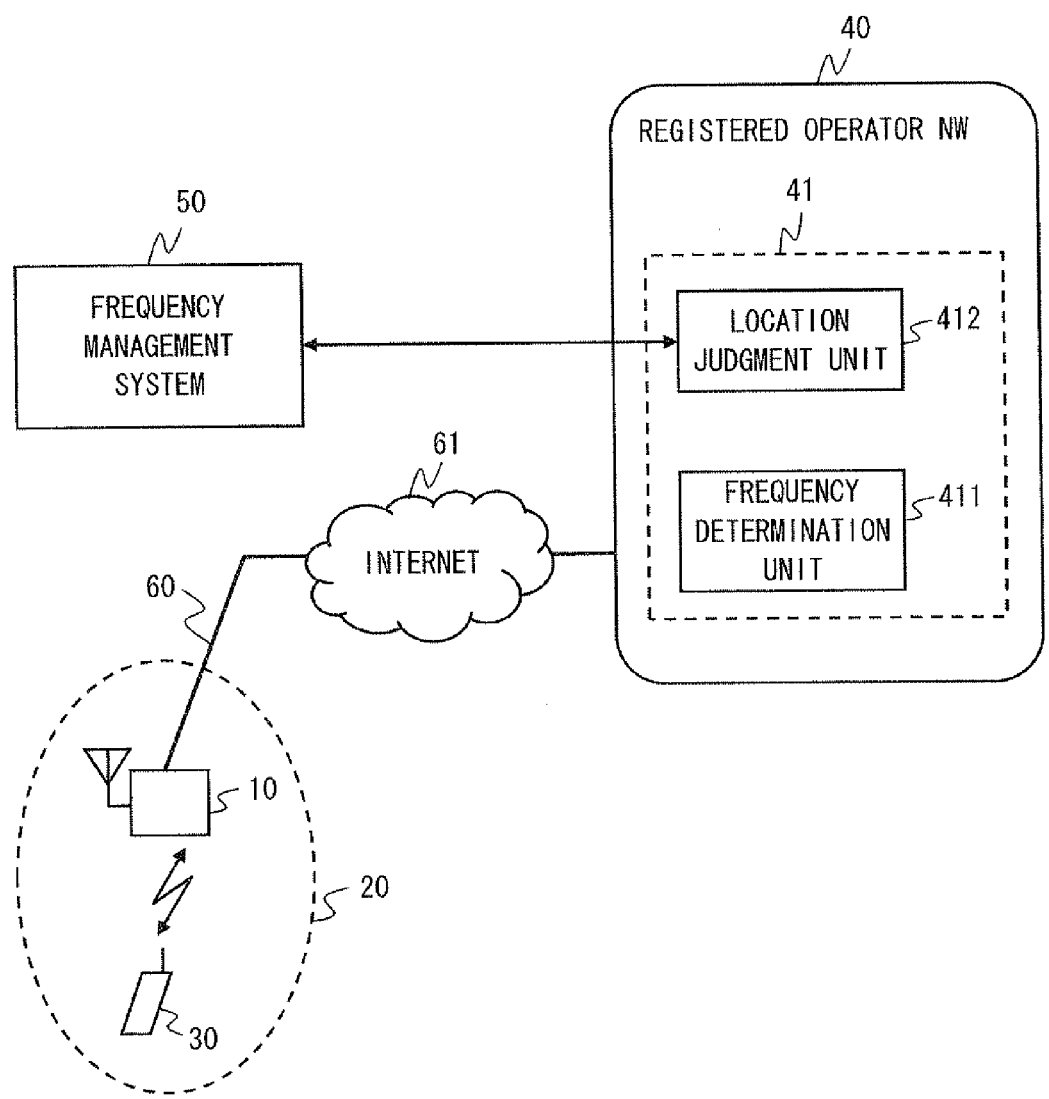
FIG. 1 is a diagram showing a configuration example of a wireless network including a wireless communication control system according to a first embodiment of the present invention.

Hereinafter, embodiments of the present invention will be described in detail with reference to the drawings. In the drawings, the same or corresponding elements are denoted by the same reference numerals, and repeated description is omitted for clarity of explanation.

First Embodiment of the Invention

FIG. 1 shows a configuration example of a wireless network including a wireless communication control unit 41 according to this embodiment. A femtocell base station 10 forms a femtocell 20 and performs wireless communication with a mobile station 30 in the femtocell 20. The femtocell base station 10 uses an Internet 61 including an IP communication network of an Internet service provider, as a backhaul network for connecting to a network 40 of a predetermined network operator (registered operator). The femtocell base station 10 connects to the Internet 61 through an Internet communication line 60 (for example, ADSL or an optical fiber line), and connects to the registered operator network 40 via the Internet 61. The registered operator network 40 performs mobility management of mobile stations and accounting management, and transfers data packets from/to an external data network and an IP service network to/from radio base stations.

A frequency management system 50 manages frequencies available for wireless communication in a second area which is different from a predetermined installable area (first area). The predetermined installable area is a service area of a registered operator. Authentication and registration of a network operator and allocation of frequencies to the network operator are generally carried out in administrative units, such as in a country or a region. Accordingly, the service area (first area) of a typical registered operator is in a certain country. On the other hand, the second area other than the service area of the registered operator is a foreign country which is different from the country in which the registered operator is authorized.

A cognitive radio technique may be applied to the frequency management system 50. In one mode of the cognitive radio, frequencies that are not used by a primary radio system of a frequency band (licensed band) licensed to the primary radio system are notified to a secondary radio system, and the secondary radio system reuses the unused frequencies temporally and spatially. In the case of North America, for example, areas and times in which television broadcasting is not provided are detected in the frequencies allocated to the television broadcasting for the entire area of the United States, and the frequencies can be reused under the condition that radio frequency interference should not be given to television broadcasting systems. The condition defines an allocated frequency band, a time required for detecting that the frequencies are not used, and radio antenna sensitivity necessary for the detection, for example. On the other hand, in the United Kingdom, the British Office of Communications (Ofcom) announced the frequency bands available for cognitive radio, and the availability requirements (detection speed, detection antenna sensitivity, detection accuracy, etc.). Thus, a radio frequency management authority in each country is expected to define frequency bands available for cognitive radio and availability requirements to be complied into a database and managed by a server.

The wireless communication control unit 41 determines a radio frequency used by the femtocell base station 10 for wireless communication with the mobile station 30. The wireless communication control unit 41 includes a location judgment unit 411 and a frequency determination unit 412. Note that in the example shown in FIG. 1, the wireless communication control unit 41 is located in the registered operator network 40. However, the wireless communication control unit 41 may be located in the femtocell base station 10. The location judgment unit 411 and the frequency determination unit 412 may be separated from each other. For example, the location judgment unit 411 may be located in the femtocell base station 10 and the frequency determination unit 412 may be located in the registered operator network 40.

The location judgment unit 411 judges whether the installation location of the femtocell base station 10 is in the first area corresponding to the service area of a predetermined registered operator. Positional information indicating the installation location of the femtocell base station 10 can be acquired using various well-known techniques. For example, positional information acquired by a GPS (Global Positioning System) receiver located in the femtocell base station 10 may be used as information indicating the installation location of the femtocell base station 10. Examples of other information indicating the installation location of the femtocell base station 10 include access point information of a public wireless service (for example, wireless LAN service), an IP address of the femtocell base station 10, and information indicating an Internet service provider or a broadband network operator to be connected with the femtocell base station 10. The location judgment unit 411 may refer to the information indicating the installation location of the femtocell base station 10, to thereby judge whether the installation location is in the service area of the registered operator.

When the installation location of the femtocell base station 10 is in the service area (first area) of the registered operator, the frequency determination unit 412 determines, by using a first procedure, the radio frequency for use in wireless communication between the femtocell base station 10 and the mobile station 30. On the other hand, when the installation location of the femtocell base station 10 is outside the service area of the registered operator (in the second area), the frequency determination unit 412 determines the radio frequency by using a second procedure different from the first procedure.

The first procedure is a procedure for setting up the femtocell base station 10 in the service area of the registered operator. Accordingly, it is only necessary to allocate from the frequencies managed by the registered operator. In the first procedure, the radio frequency used by the femtocell base station 10 may be determined from the frequency range managed in the registered operator network 40. For example, when the wireless communication control unit 41 is located in the femtocell base station 10, the frequency range may be preliminarily recorded in a non-volatile memory within the femtocell base station 10. In this case, the wireless communication control unit 41 may determine the radio frequency for use in communication with the mobile station 30 from the frequency range recorded in the non-volatile memory, in consideration of interference with another wireless network, communication services to be provided, the radio channel type and communication speed required by the mobile station 30, and the like.

The second procedure is a procedure for setting up the femtocell base station 10 in the second area which is an area outside the service area of the registered operator. Accordingly, the second procedure includes sending an inquiry to the frequency management system 50 that manages the frequency of the second area; receiving a response (frequency information) indicating available frequencies; and determining the radio frequency for use in communication between the base station 10 and the mobile station 30 from among the available frequencies indicated by the frequency information. The frequency information may include use conditions such as a time period in which the use of a frequency is allowed, and an upper limit of transmission power. When the frequency determination unit 412 is located in the base station 10, the base station 10 may acquire the frequency information via the Internet communication line 60, for example. The base station 10 may acquire the frequency information by receiving a radio signal containing the frequency information transmitted from the radio station installed in the second area.

Figure 2:
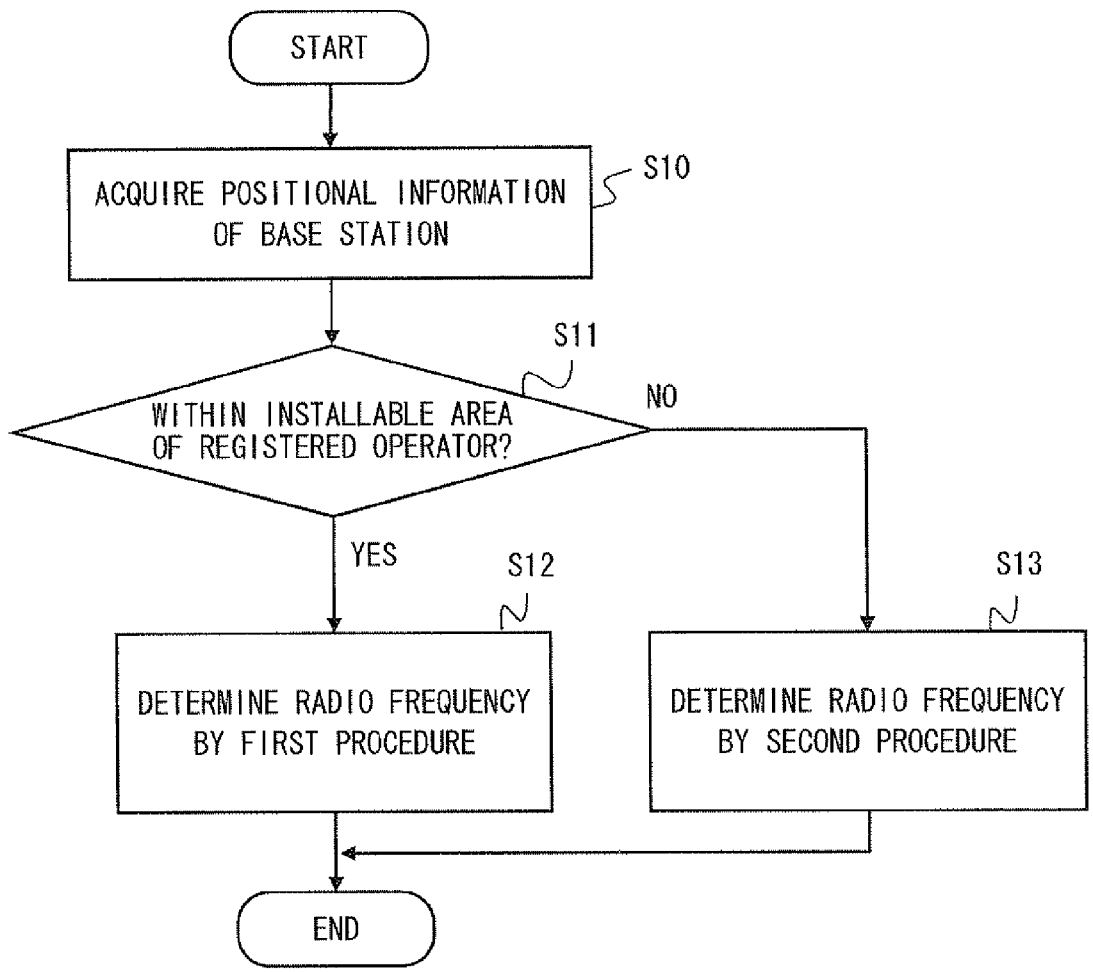
FIG. 2 is a flowchart showing a procedure for determining a radio frequency according to the first embodiment of the present invention.

FIG. 2 is a flowchart showing a specific example of a frequency determination procedure by the wireless communication control unit 41. In step S10, the location judgment unit 411 acquires the positional information indicating the installation location of the femtocell base station 10. In step S11, the location judgment unit 411 judges whether the installation location of the base station 10 is in the predetermined installable area, in other words, judges whether the installation location is in the service area of the registered operator. When the installation location is in the installable area (YES in step S11), the frequency determination unit 412 determines the radio frequency used by the base station 10 according to the first procedure described above. On the other hand, when the installation location is out of the installable area (NO in step S11), the frequency determination unit 412 determines the radio frequency used by the base station 10 according to the second procedure described above.

Figure 3:
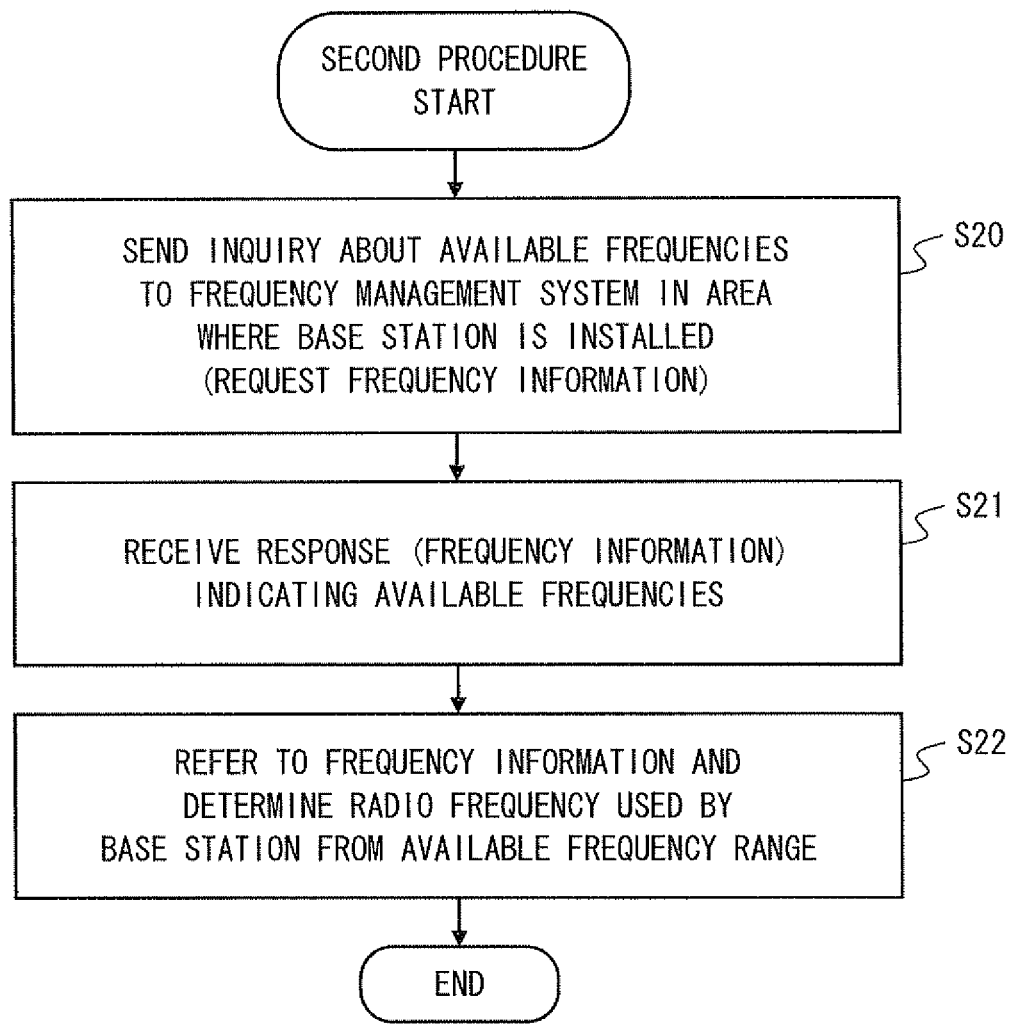
FIG. 3 is a flowchart showing a specific example of a second procedure shown in FIG. 2.

FIG. 3 is a flowchart showing a specific example of the second procedure. In step S20, the frequency determination unit 412 sends an inquiry about available frequencies to the frequency management system 50 in the second area in which the base station 10 is installed. In step S21, the frequency determination unit 412 receives the response (frequency information) indicating the available frequencies from the frequency management system 50. In step S22, the frequency determination unit 412 refers to the received frequency information, and determines the radio frequency used by the base station 10 from among the available frequencies.

As described above, in this embodiment, even when the installation location of the femtocell base station 10 is outside the service area of the predetermined registered operator, the femtocell base station 10 can be activated. Specifically, the wireless communication control unit 41 judges the installation location of the femtocell base station 10. When the installation location of the femtocell base station 10 is outside the service area of the predetermined registered operator (in the second area), the wireless communication control unit 41 receives the frequency information indicating the available frequencies from the frequency management system 50 that manages the frequency of the second area, and determines the radio frequency used by the femtocell base station 10 based on the frequency information.

Thus, even when the installation location is the second area (for example, a foreign country) in which the wireless communication system of the subscribing registered operator is not launched, a user installs the femtocell base station 10 in the second area, thereby making it possible to connect the mobile station 30, which is owned by the user, to the registered operator network 40. In addition, it is not necessary for the user to connect the mobile station 30 to a network of a local network operator of the second area. Accordingly, it is not necessary for the user to pay the local operator a roaming charge. The mobile station 30 can use communication services equivalent to those provided by the registered operator also in the second area, with no limitations on radio resource and provided service types of the local operator. For example, a tourist who is visiting a foreign country connects the femtocell base station 10 to a LAN (Local Area Network) in a hotel or the like where the tourist is staying. This allows the tourist to use the mobile station 30 (for example, a mobile phone terminal) in the same manner as in his/her country, without the need of paying an international roaming charge.

Note that the femtocell base station 10 may refuse connection of a mobile station having not subscribed to the registered operator, as with typical radio base stations and femtocell base stations. This allows only mobile stations subscribing to the registered operator to connect to the registered operator network 40 through the femtocell base station 10. On the other hand, mobile stations having not subscribed to the registered operator is expected to connect to the network of the local operator.

The processing carried out by the location judgment unit 411 and frequency determination unit 412 described above can be implemented using an ASIC (Application Specific Integrated Circuit), a DSP (Digital Signal Processor), an MPU (Micro Processing Unit), or a CPU (Central Processing Unit), or a computer system including a combination thereof. Specifically, one or more programs including an instruction set related to these processing procedures may be executed by a computer system.

These programs can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (erasable PROM), flash ROM, RAM (random access memory), etc.). The programs may be provided to a computer using any type of transitory computer-readable media. Examples of transitory computer-readable media include electric signals, optical signals, and electromagnetic waves. Transitory computer-readable media can provide the programs to a computer via a wired communication line, such as electric wires and optical fibers, or a wireless communication line.

Second Embodiment of the Invention

Figure 4:
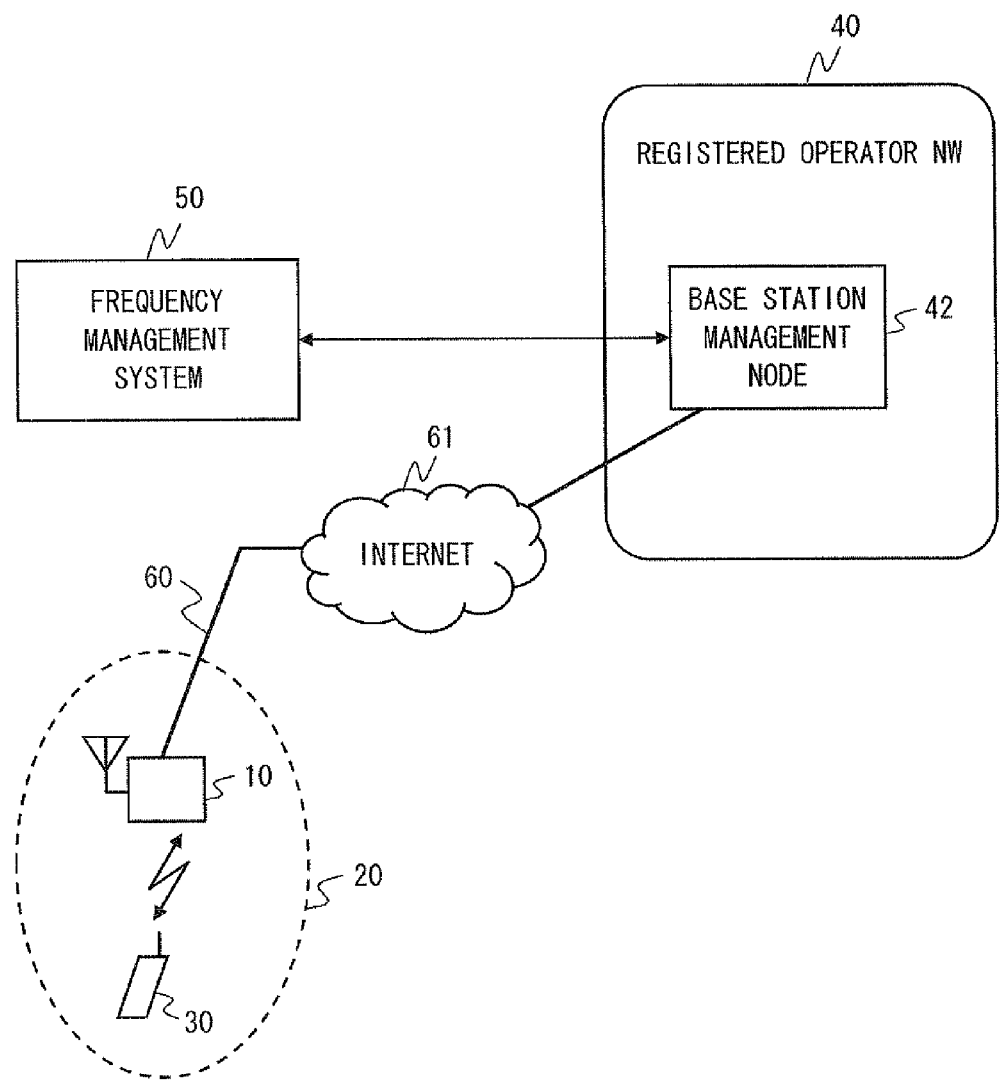
FIG. 4 is a diagram showing a configuration example of a wireless network including a radio base station and a base station management node according to a second embodiment of the present invention.

In this embodiment, a specific example of the frequency determination procedure described in the first embodiment of the invention will be described. FIG. 4 shows a configuration example of a wireless network according to this embodiment. According to this embodiment, in the frequency determination procedure described in the first embodiment of the invention, a base station management node 42 judges the location of the femtocell base station 1 and acquires frequency information from the frequency management system 50. Further, the femtocell base station 10 determines a radio frequency by using the frequency information obtained from the frequency management system 50.

The base station management node 42 is located in the registered operator network 40 and performs signaling for setting up the femtocell base station 10. The base station management node 42 operates as a gateway to the femtocell base station 10 that accesses the registered operator network 40 via the Internet 61.

Figure 5:
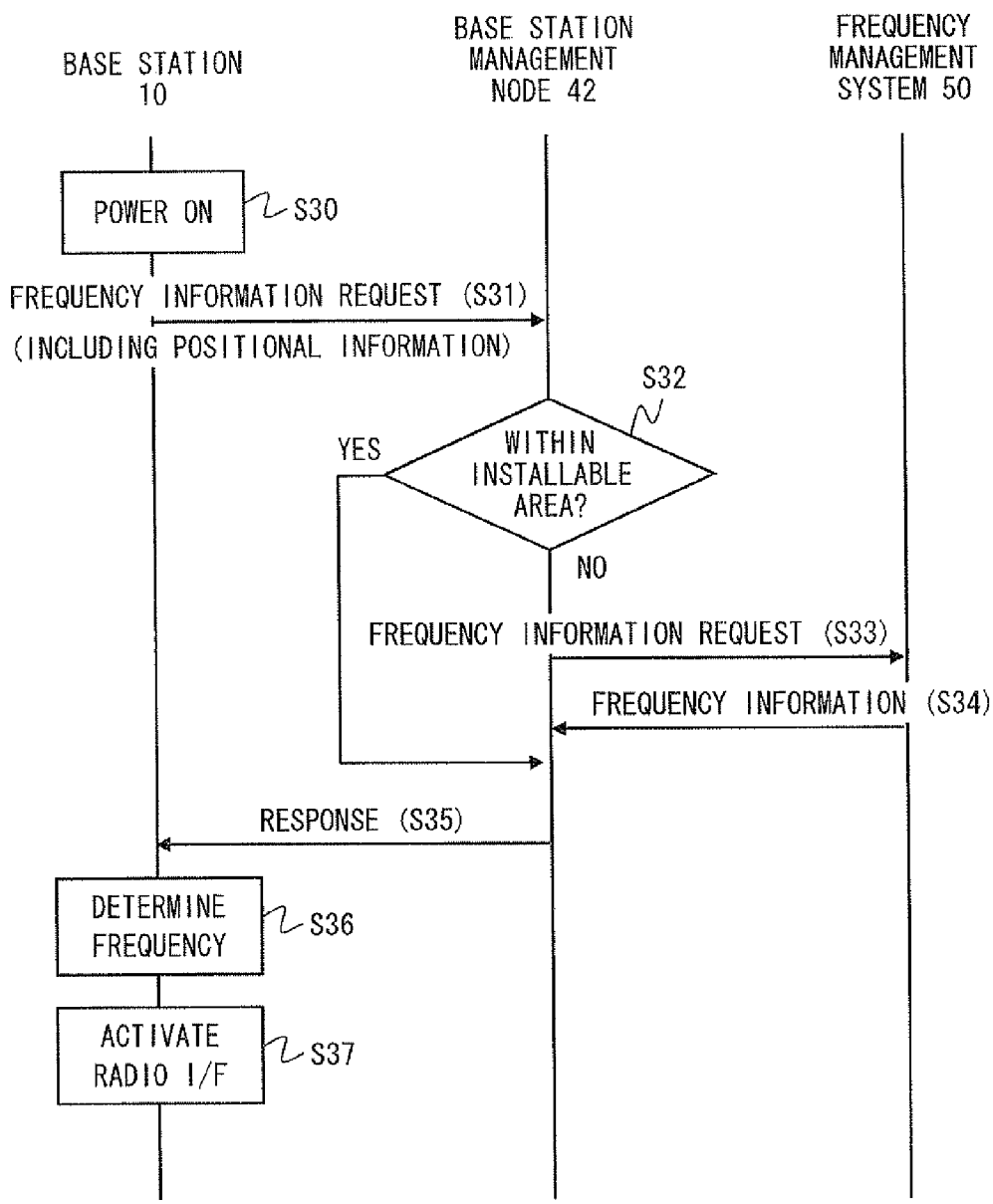
FIG. 5 is a sequence diagram showing a procedure for determining a radio frequency according to the second embodiment of the present invention.

FIG. 5 is a sequence diagram showing the procedure for determining a radio frequency according to this embodiment. In step S30, the user connects the femtocell base station 10 to the Internet communication line 60, and turns the femtocell base station 10 on. In response to power-on, the femtocell base station 10 starts a base station registration sequence and accesses the base station management node 42. Specifically, the femtocell base station 10 acquires positional information and transmits a frequency information request message including the positional information (step S31).

In step S32, the base station management node 42 judges whether the installation location of the femtocell base station 10, which is obtained from the positional information, is in the installable area. When the installation location is not in the installable area (for example, when it is judged that the installation location is in a foreign country), the base station management node 42 sends a request for the frequency information to the frequency management system 50 that manages the frequencies in the installation location of the femtocell base station 10 (step S33). In step S34, the base station management node 42 receives, from the frequency management system 50, the frequency information indicating frequencies available in the installation location of the base station 10. The frequency information may include use conditions such as an available period and an upper limit of transmission power.

When judging that the installation location of the base station 10 is in the installable area (YES in step S32), the base station management node 42 notifies the base station 10 of frequencies that are allowed in the installable area recognized by the base station management node 42 (step S35). On the other hand, when judging that the installation location of the base station 10 is outside the installable area (NO in step S32), the base station management node 42 notifies the base station 10 of the available frequencies indicated by the frequency information received from the system 50 (step S35).

In step S36, the femtocell base station 10 determines radio frequency to be used from among the available frequencies received from the base station management node 42. At this time, the femtocell base station 10 may select radio frequency so as to avoid interference with signals of another wireless network which exists in the vicinity of the femtocell 20.

In step S37, the femtocell base station 10 activates a radio interface by using the radio frequency selected in step S36 to generate the femtocell 20, and shifts to an operation state capable of accepting connection of the mobile station 30.

Third Embodiment of Invention

Figure 6:
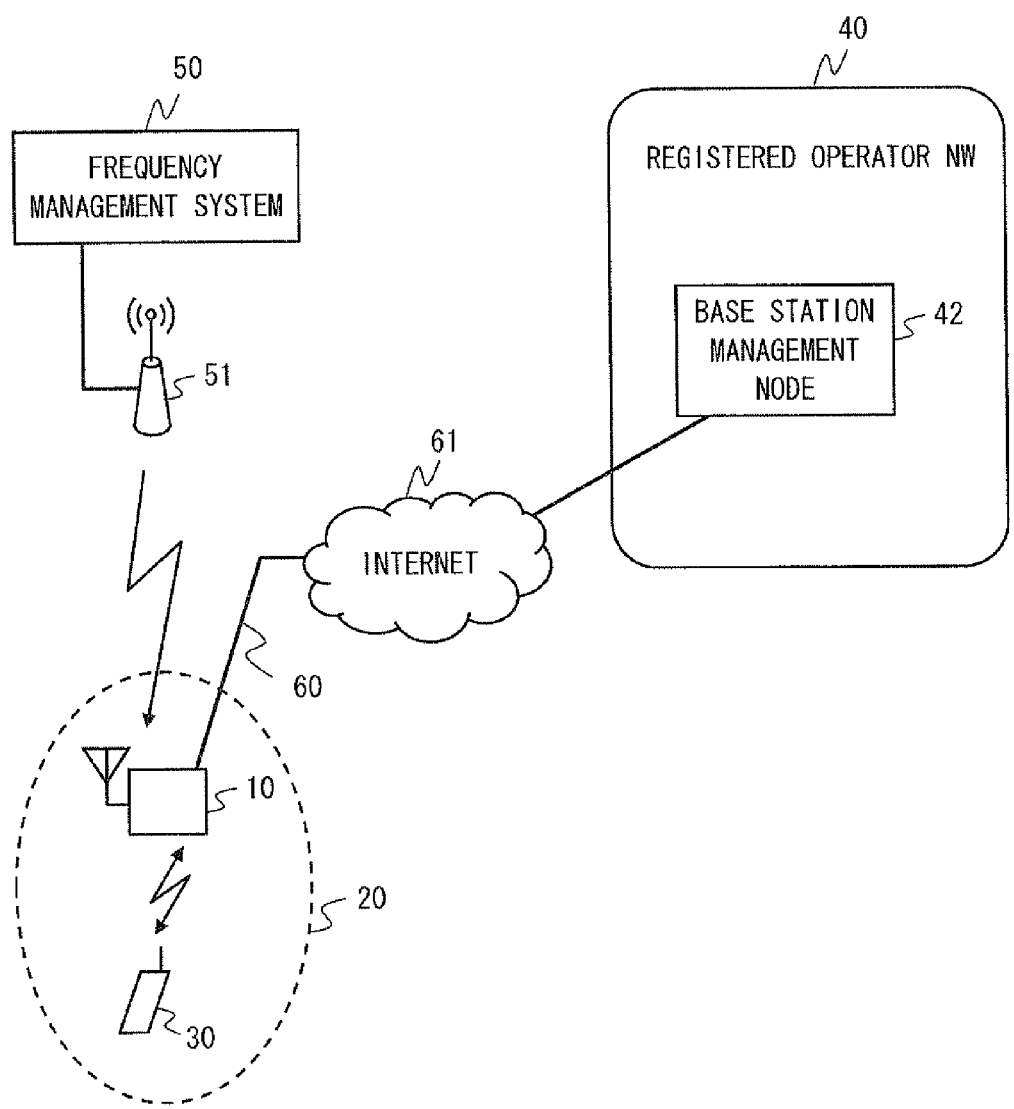
FIG. 6 is a diagram showing a configuration example of a wireless network including a radio base station according to a third embodiment of the present invention.

In this embodiment, another specific example of the frequency determination procedure described in the first embodiment of the invention will be described. FIG. 6 shows a configuration example of a wireless network according to this embodiment. In this embodiment, the frequency determination procedure described in the first embodiment of the invention is carried out by the femtocell base station 10. A radio station 51 sends a radio signal containing frequency information supplied from the frequency management system 50. When judging that the installation location of the femtocell base station 10 is outside a predetermined installable area (i.e., outside a service area of a registered operator), the femtocell base station 10 acquires the frequency information by receiving the radio signal broadcast from the radio station 51.

Figure 7:
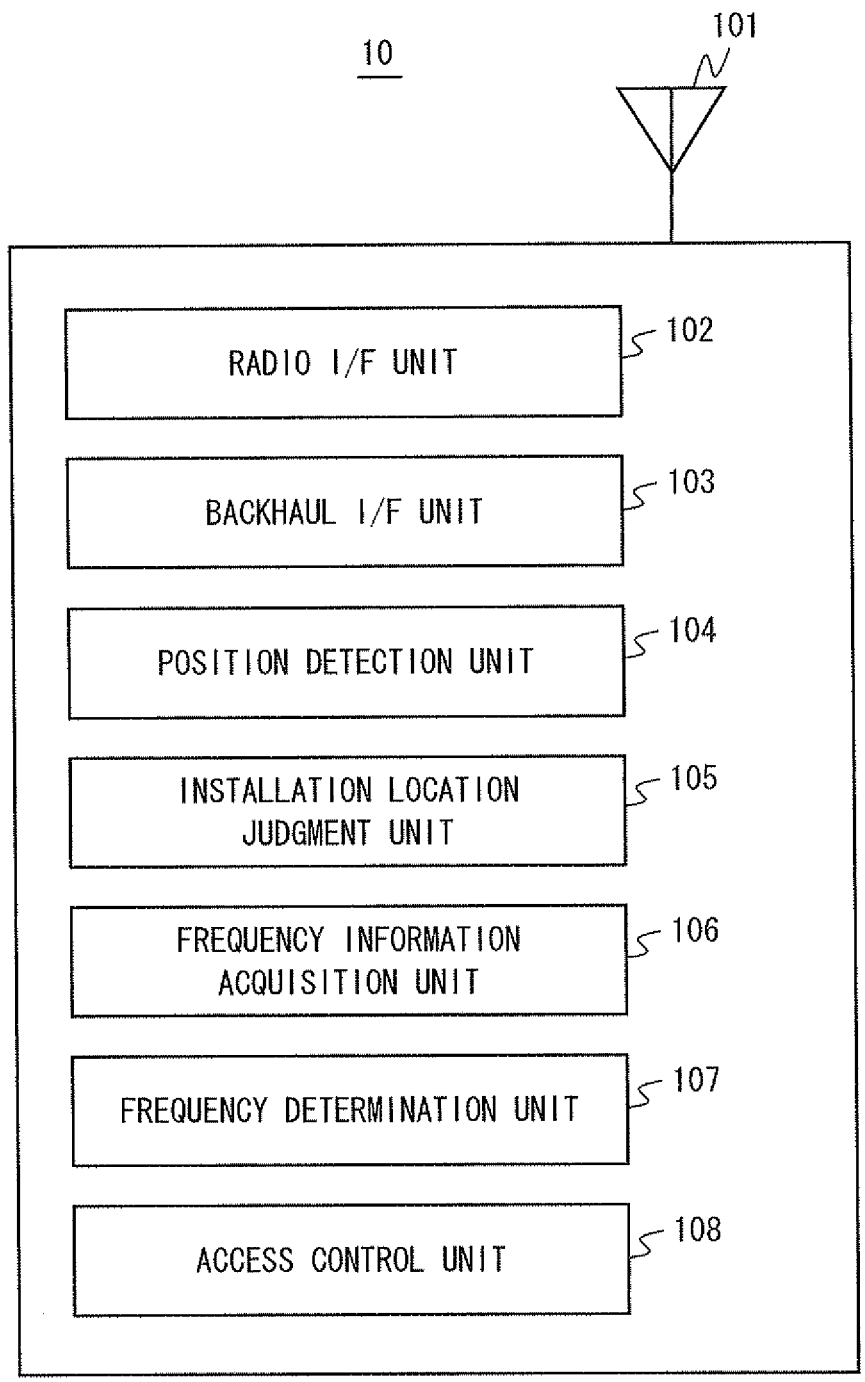
FIG. 7 is a block diagram showing a configuration example of the radio base station according to the third embodiment of the present invention.

FIG. 7 is a block diagram showing a configuration example of the femtocell base station 10 according to this embodiment. A radio interface unit 102 generates the femtocell 20 by transmitting and receiving radio signals through an antenna 101, and performs wireless communication with the mobile station 30. Further, the radio interface unit 102 receives the radio signal from the radio station 51 through the antenna 101. Note that the radio interface unit 102 may include a transceiver for performing wireless communication with the mobile station 30, and a receiver for receiving the radio signal from the radio station 51. Similarly, the antenna 101 may include an antenna for performing wireless communication with the mobile station 30, and an antenna for receiving the radio signal from the radio station 51.

A backhaul interface unit 103 includes a communication interface connected to the Internet communication line 60, and establishes a secure communication channel, such as an IPsec communication channel, with the base station management node 42.

A position detection unit 104 acquires positional information capable of judging the installation location of the femtocell base station 10. For example, the position detection unit 104 may include a GPS receiver and may acquire positional information acquired by the GPS (Global Positioning System) receiver. Further, the position detection unit 104 may acquire, as the positional information, access point information of a public wireless service (for example, a wireless LAN service), an IP address automatically allocated to the backhaul interface unit 103, or information indicating an Internet service provider or a broadband network operator to be connected with the backhaul interface unit 103.

An installation location judgment unit 105 corresponds to the location judgment unit 411 described above. Specifically, the installation location judgment unit 105 judges whether the installation location of the femtocell base station 10 is in the first area corresponding to the service area of the predetermined registered operator, based on the positional information acquired from the position detection unit 104.

When the installation location of the femtocell base station 10 is in the first area, a frequency information acquisition unit 106 acquires available frequency information held in a non-volatile memory within the femtocell base station 10, or available frequency information supplied from the base station management node 42. On the other hand, when the installation location of the femtocell base station 10 is outside the first area, the frequency information acquisition unit 106 acquires frequency information contained in the radio signal notified from the radio station 51.

A frequency determination unit 107 refers to the frequency information acquired by the frequency information acquisition unit 106, and determines the radio frequency to be applied to the radio interface unit 102 from among the frequencies available in the installation location of the base station 10.

An access control unit 108 judges whether or not to permit connection of the mobile station 30 to the registered operation network 40 through the base station 10. For example, the access control unit 108 may permit connection of all mobile stations subscribing to the registered operator, or permit connection of only the preliminarily designated mobile station among the mobile stations subscribing to the registered operator. Further, the access control unit 108 may connect the mobile station, which has refused to connect to the registered operator network 40, to a network of an operator that provides services in the installation location of the femtocell base station 10. When the femtocell base station 10 includes the access control unit 108, a communication path with the registered operator network 40 can be selectively established with respect to the mobile station subscribing to the registered operator network. Note that the function of the access control unit 108 may be located not in the base station 10, but in an apparatus within the registered operator network 40, such as the base station management node 42.

Figure 8:
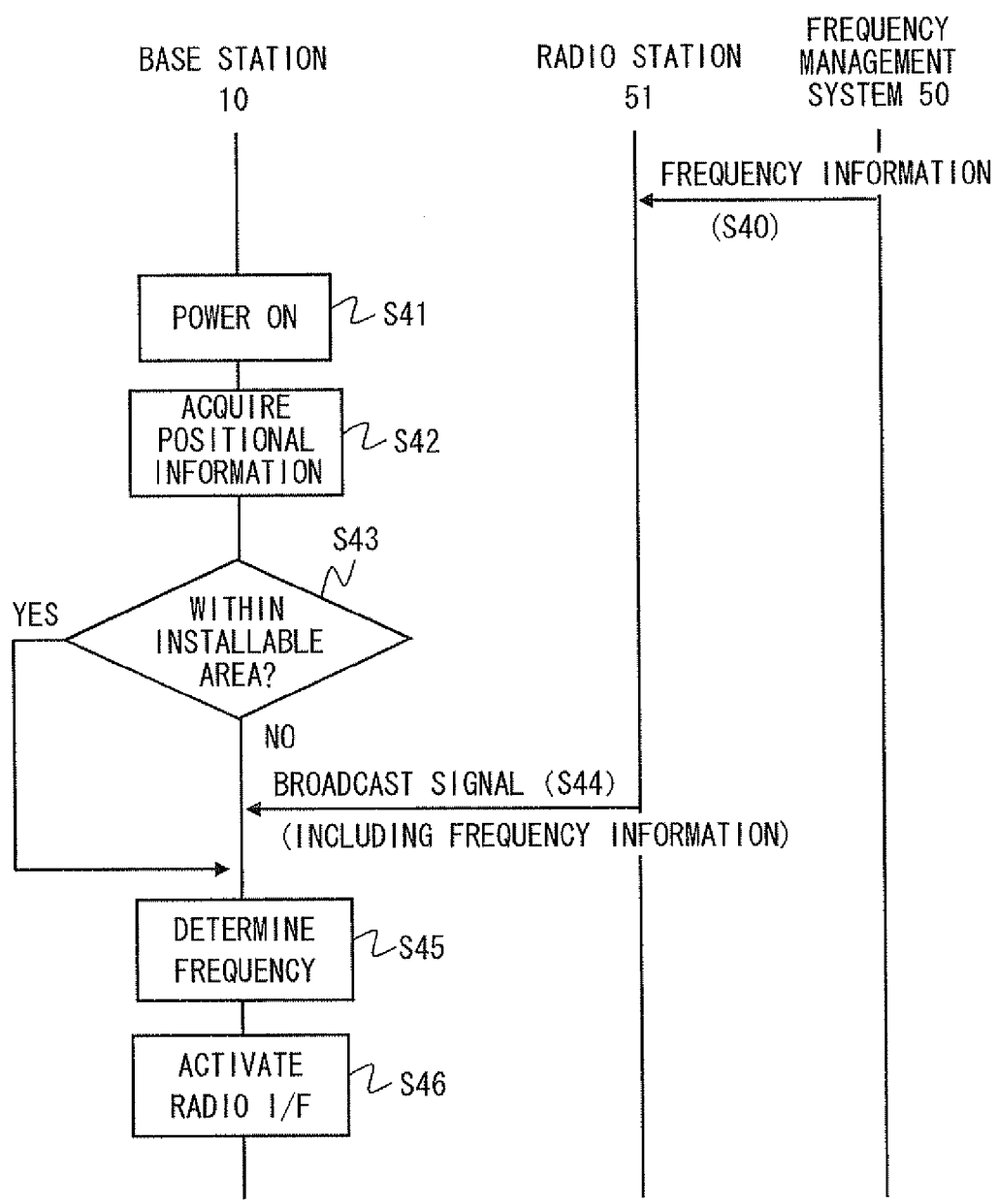
FIG. 8 is a sequence diagram showing a procedure for determining a radio frequency according to the third embodiment of the present invention.

FIG. 8 is a sequence diagram showing the procedure for determining a radio frequency according to this embodiment. In step S40, the frequency management system 50 supplies the frequency information to the radio station 51. In step S41, the user connects the femtocell base station 10 to the Internet communication line 60, and turns the femtocell base station 10 on. The femtocell base station 10 starts the base station registration sequence in response to power-on, and accesses the base station management node 42. In step S42, the position detection unit 104 acquires the positional information.

In step S43, the installation location judgment unit 105 judges whether the installation location of the femtocell base station 10, which is obtained from the positional information, is in the installable area. When the installation location is not in the installable area (for example, when it is judged that the installation location is in a foreign country), the frequency information acquisition unit 106 acquires the frequency information contained in the signal received from the radio station 51 (step S44). In step S45, the frequency determination unit 107 refers to the frequency information acquired by the frequency information acquisition unit 106, and determines the radio frequency to be applied to the radio interface unit 102 for wireless communication with the mobile station 30. In step S46, the femtocell base station 10 activates the radio interface unit 102 by using the radio frequency selected in step S45 to generate the femtocell 20, and shifts to the operation state capable of accepting connection of the mobile station 30.

Fourth Embodiment of the Invention

In this embodiment, a specific example of an access restriction by the femtocell base station 10 will be described. The femtocell base station 10 according to this embodiment provides a connection between a mobile station and a network of a local operator that provides services in an installation location, when the installation location is outside the installable area of the registered operator.

Figure 9:
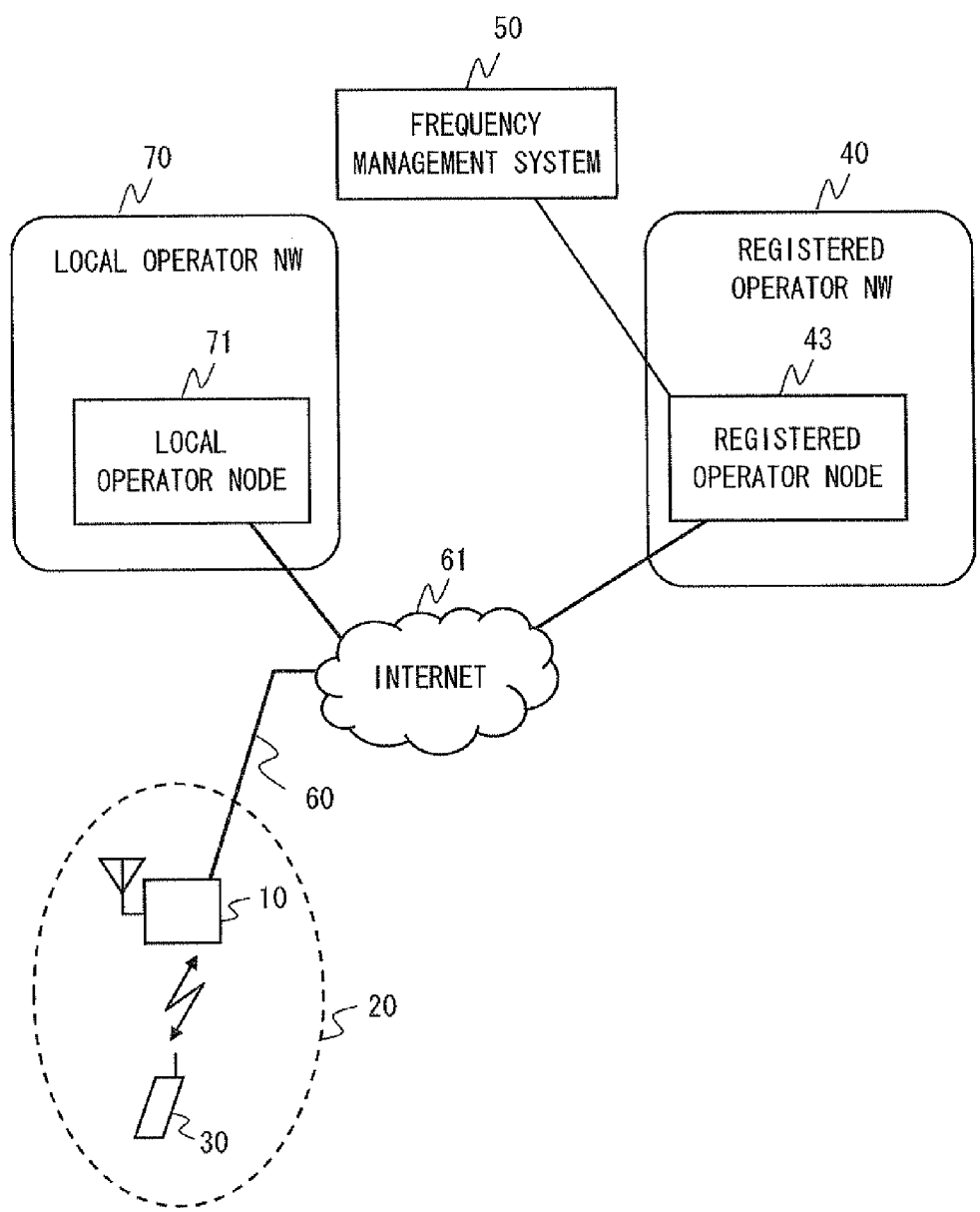
FIG. 9 is a diagram showing a configuration example of a radio base station according to a fourth embodiment of the present invention.

FIG. 9 shows a configuration example of a wireless network including the femtocell base station 10 according to this embodiment. Note that FIG. 9 shows a variation of the second embodiment of the invention described above, but the access restriction operation of the femtocell base station 10 described in this embodiment can also be applied to the first and third embodiments of the invention described above. The femtocell base station 10 may have a configuration similar to the configuration example shown in FIG. 7. The access control unit 108 included in the femtocell base station 10 connects the mobile station 30 subscribing to the registered operator to the registered operator network 40, and connects the mobile station 30 subscribing to the local operator to a local operator network 70.

Figure 10:
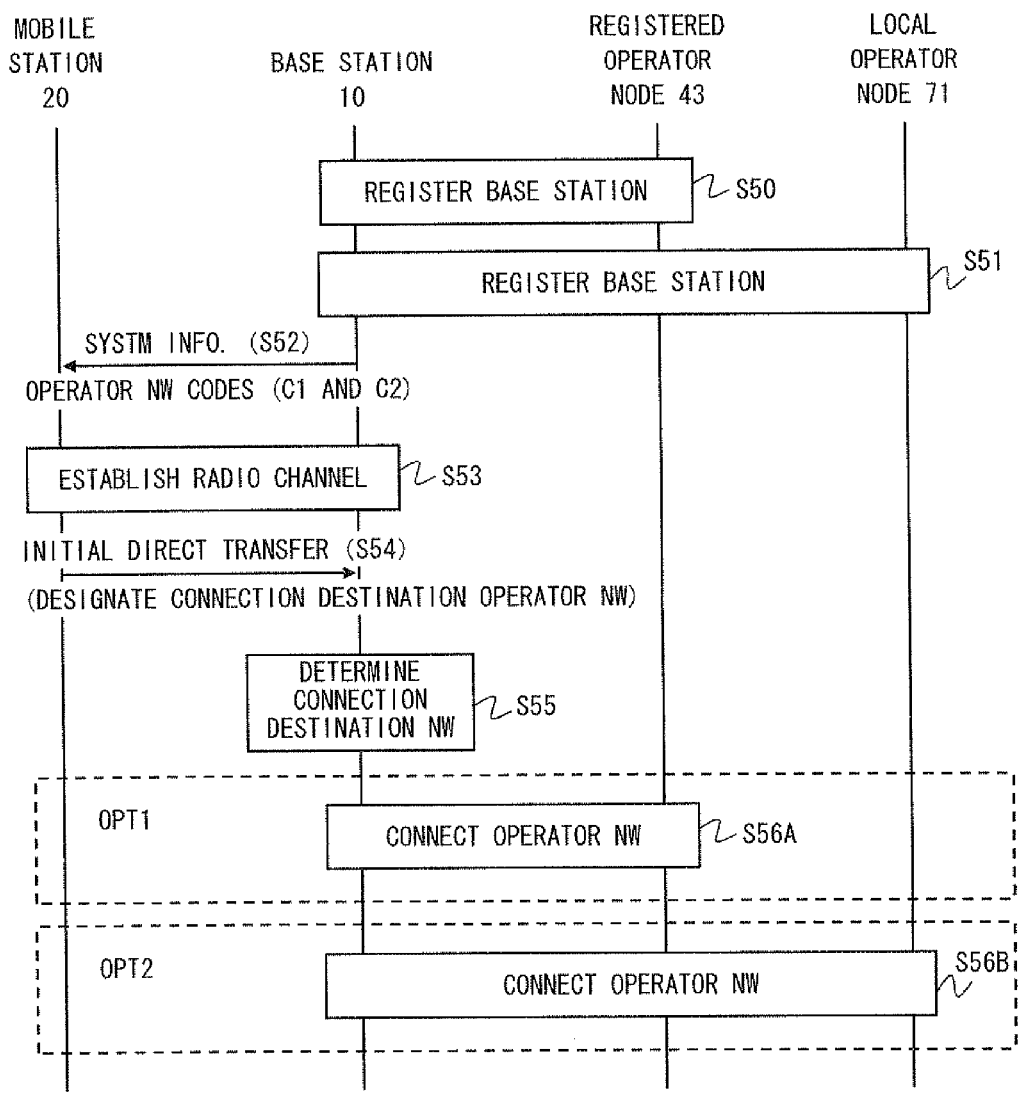
FIG. 10 is a sequence diagram showing a specific example of an access restriction by the radio base station according to the fourth embodiment of the present invention.

FIG. 10 is a sequence diagram showing a specific example of access restriction by the femtocell base station 10 according to this embodiment. In steps S50 and S51, the femtocell base station 10 accesses a registered operator node 43, which is located in the registered operator network 40, and a local operator node 71, which is located in the local operator network 70, and executes registration of the base station for these two operator networks. In steps S50 and S51, the radio frequency used by the femtocell base station 10 for communication with the mobile station 30 is determined using any one of the frequency determination procedures described in the first to third embodiments of the invention. Note that at this time, the femtocell base station 10 may select the radio frequency for use in communication with the mobile station 30, not only from among the available frequencies designated by the frequency information received from the frequency management system 50, but also from among the frequencies available in the local operator network 70.

In step S52, in order to notify the mobile station 30 that the connection to the registered operator network 40 and the local operator network 70 is acceptable, the femtocell base station 10 transmits information indicating these two networks. For example, the femtocell base station 10 may transmit system information including operator network codes C1 and C2, which respectively represent the networks 40 and 70, by using a radio channel for transmitting broadcast information.

In step S53, the femtocell base station 10 establishes uplink and downlink radio channels with the mobile station 30.

In step S54, the mobile station 30 sends an initial message (for example, an initial direct transfer message) for an operator network to the base station 10. The message includes a parameter (for example, PLMN Identity) representing the operator network. The value of this parameter corresponds to the operator code which represents the network 40 or 70 and which is received by the mobile station 30 in step S52.

In step S55, the femtocell base station 10 (access control unit 108) judges whether the connection destination operator network designated by the message received from the mobile station 30 is either the network 40 or the network 70. Further, the access control unit 108 may confirm whether the mobile station 30 has subscribed to the registered operator or the local operator.

When judging that the connection destination is the registered operator network 40 in step S55, the femtocell base station 10 connects the mobile station 30 to the registered operator node 43 (step S56A).

When judging that the connection destination is the local operator network 70 in step S55, the femtocell base station 10 connects the mobile station 30 to the local operator node 71 (step S56B).

Note that in the above description, the number of operator networks connectable with the femtocell base station 10 is two, but may be three or more. As described above, the access control unit 108 may be located not in the femtocell base station 10, but in the registered operator network 40 and the local operator network 70. In this case, in the case of connection to an operator network different from subscribed e operator network of mobile station 30, the corresponding operator network node may refuse the connection.

In this embodiment, not only the mobile station subscribing to the registered operator, but also the mobile station subscribing to the local operator of the installation area of the femtocell base station 10 can be connected to the femtocell base station 10. Accordingly, this embodiment has an advantage in that the communication area of the local operator network 70 can be expanded, in addition to the advantageous effects described in the first to third embodiments of the invention described above.

Furthermore, as described about steps S50 and S51 of FIG. 10, there is another advantage in that the number of frequencies to be selected is increased because the femtocell base station can select the radio frequency for use in communication between the femtocell base station 10 and the mobile station 30 from among the frequencies available in the local operator network 70.

Fifth Embodiment of the Invention

In this embodiment, another specific example of access restriction by the femtocell base station 10 will be described. The femtocell base station 10 according to this embodiment permits a request for connection with the registered operation network 40 as well as another arbitrary visitor operator network 80.

Figure 11:
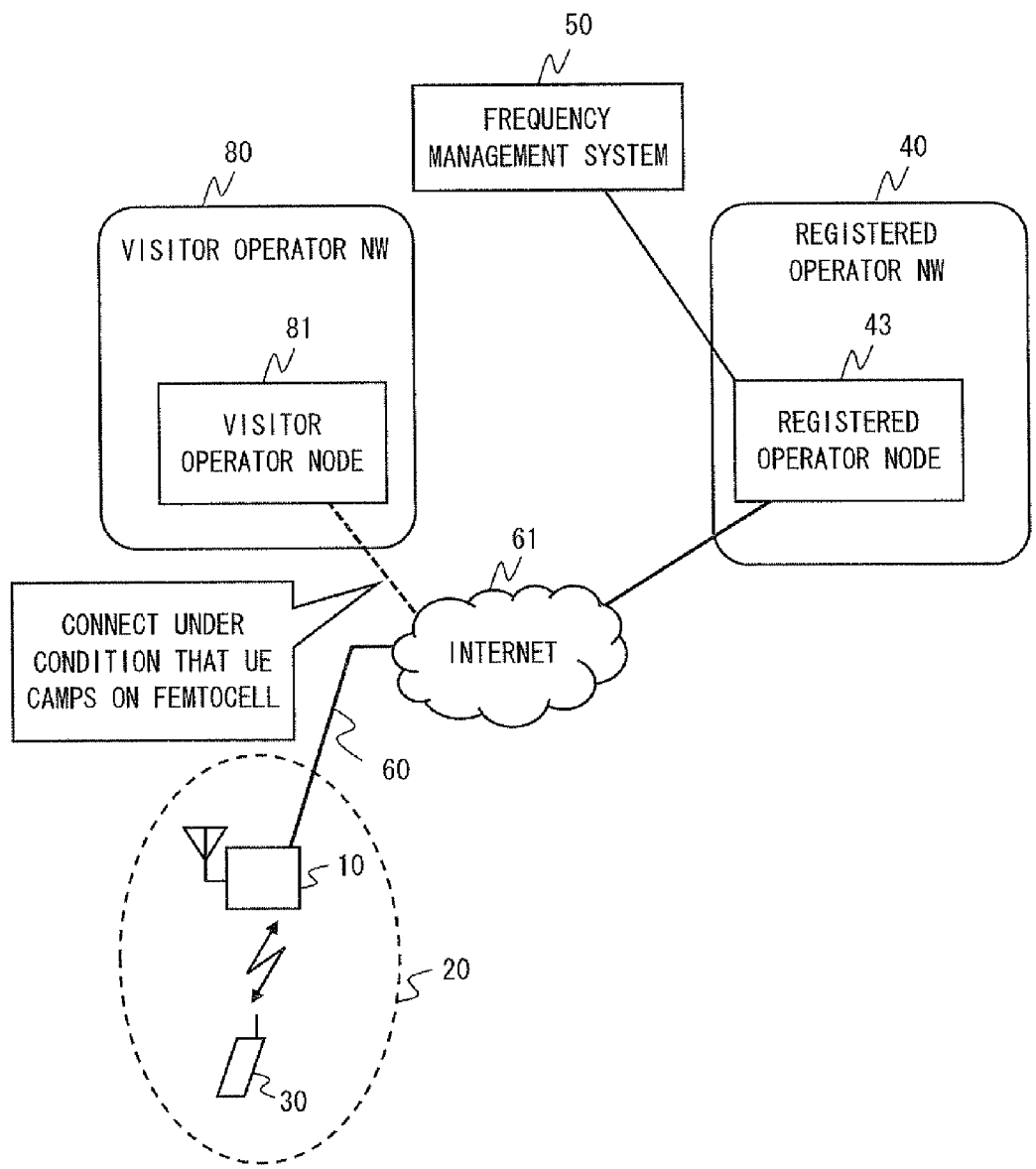
FIG. 11 is a diagram showing a configuration example of a wireless network including a radio base station according to a fifth embodiment of the present invention.

FIG. 11 shows a configuration example of a wireless network including the femtocell base station 10 according to this embodiment. Though FIG. 11 shows a variation of the second embodiment of the invention described above, the access restriction operation of the femtocell base station 10 described in this embodiment can also be applied to the first and third embodiments of the invention described above. The femtocell base station 10 may have a configuration similar to that of the configuration example shown in FIG. 7. The femtocell base station 10 executes registration of the base station for the registered operation network 40 in response to power-on. The access control unit 108 included in the femtocell base station 10 connects the mobile station 30, which has subscribed to the registered operator, to the registered operator network 40. Further, when the mobile station 30 subscribing to a visitor operator camps on the femtocell 20, the femtocell base station 10 executes registration of the base station for the visitor operator network 80 and connects the mobile station 30 subscribing to the visitor operator to the visitor operator network 80. An example of the visitor operator network 80 is the local operator network 70 described in the fourth embodiment of the invention.

Figure 12:
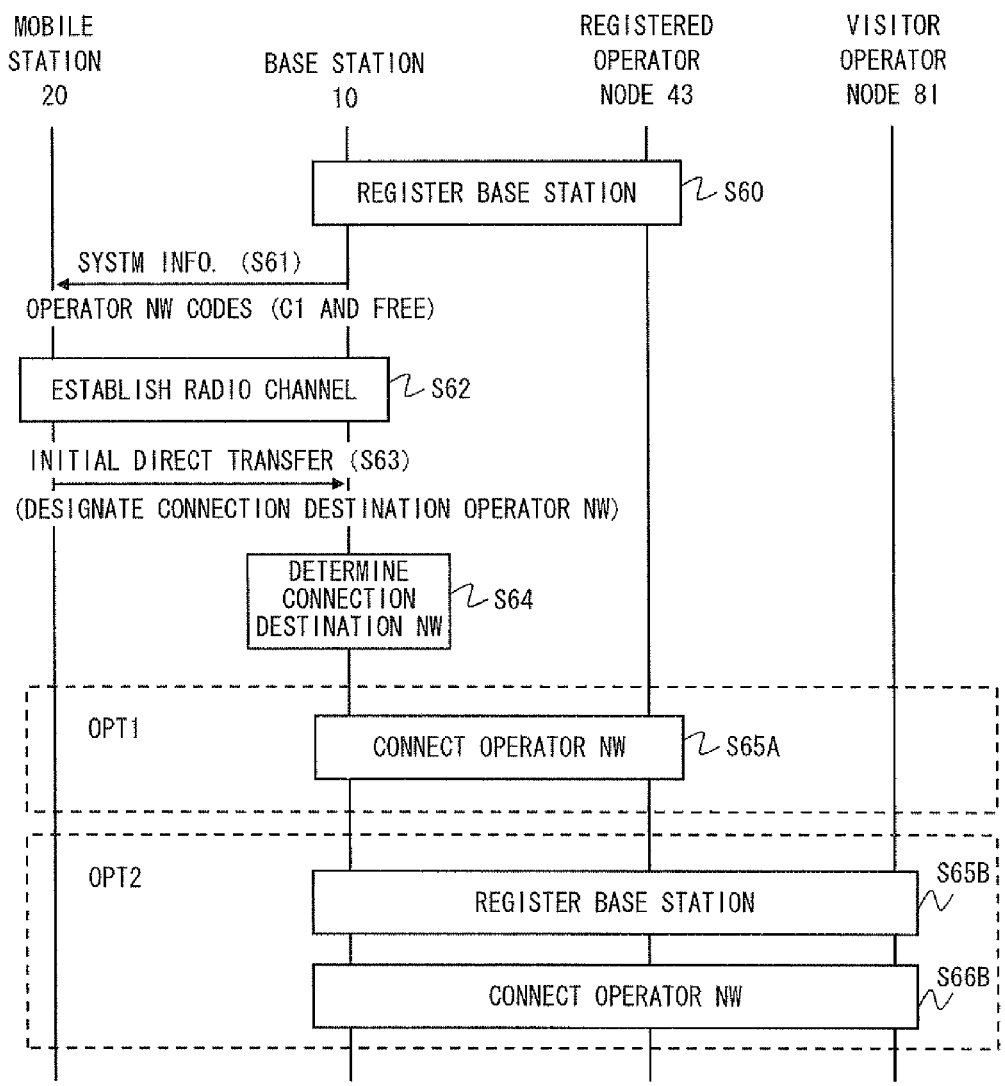
FIG. 12 is a sequence diagram showing a specific example of an access restriction by the radio base station according to the fifth embodiment of the present invention.

FIG. 12 is a sequence diagram showing a specific example of the access restriction by the femtocell base station 10 according to this embodiment. In step S60, the femtocell base station 10 accesses the registered operator node 43 located in the registered operator network 40, and executes registration of the base station for the registered operator network 40. In step S60, the radio frequency used by the femtocell base station 10 for communication with the mobile station 30 is determined using any one of the frequency determination procedures described in the first to third embodiments of the invention.

In step S61, the femtocell base station 10 notifies the mobile station 30 that the connection to the registered operator network 40 and another arbitrary visitor operator network 80 is acceptable. Specifically, the femtocell base station 10 may transmit system information including the code C1 representing the registered operator network 40 and a code "free" representing a connection to the arbitrary visitor operator network 80, by using a radio channel for transmitting broadcast information.

In step S62, the femtocell base station 10 establishes uplink and downlink radio channels with the mobile station 30.

In step S63, the mobile station 30 sends an initial message (for example, an initial direct transfer message) for an operator network to the base station 10. The message includes a parameter (for example, PLMN Identity) representing an operator network to which the mobile station 30 wishes to connect.

In step S64, the femtocell base station 10 (access control unit 108) judges the connection designation operator network designated by the message received from the mobile station 30. Further, the access control unit 108 may confirm whether the mobile station 30 has subscribed to the operator of the connection destination.

In step S64, when judging that the connection destination is the registered operator network 40, the femtocell base station 10 connects the mobile station 30 to the registered operator node 43 (step S65A).

When judging that the connection destination is the visitor operator network 80 in step S64, the femtocell base station 10 executes registration of the base station for the visitor operator network 80, and connects the mobile station 30 to a visitor operator node 81 (steps SS65B and S66B).

According to this embodiment, the femtocell base station 10 can connect the mobile station 30, which camps on the femtocell 20, not only to the registered operator but also to an arbitrary visitor operator. Accordingly, it is not necessary for the user subscribing to the visitor operator to connect the mobile station 30 to a network of a local network operator (local operator) in the second area. Thus, it is not necessary for the user to pay the local operator a roaming charge. Further, the mobile station 30 can use communication services equivalent to those provided by the visitor operator also in the second area, without limitations by the local operator on radio resources and provided service types.

Moreover, the present invention is not limited only to the embodiments described above, but can be modified in various manners without departing from the gist of the present invention described above.

The whole or part of the embodiments disclosed above can be described as, but not limited to, the following supplementary notes.

(Supplementary Note 1)

A wireless communication control system including:

judgment means for judging whether an installation location of a radio base station is in a first area corresponding to a service area of a first network operator; and frequency determination means for determining, by using a first procedure, a radio frequency for use in wireless communication between the radio base station and a mobile station when the installation location is in the first area, and for determining the radio frequency by using a second procedure different from the first procedure when the installation location is outside the first area, wherein the second procedure includes:
receiving, from a frequency management system that manages a frequency of a second area being outside the first area and including the installation location, information on a frequency available in the installation location; and
determining the radio frequency based on the frequency information.

(Supplementary Note 2)

The wireless communication control system according to Supplementary note 1, wherein the first area is in a predetermined first country, and the second area is in a second country different from the first country.

(Supplementary Note 3)

The wireless communication control system according to Supplementary note 1 or 2, wherein the frequency determination means includes an acquisition unit that is located in one of a network of the first network operator and the radio base station and acquires the frequency information by signaling with the frequency management system.

(Supplementary Note 4)

The wireless communication control system according to Supplementary note 3, wherein the acquisition unit is located in the radio base station and acquires the frequency information through an Internet communication line.

(Supplementary Note 5)

The wireless communication control system according to Supplementary note 1 or 2, wherein the frequency determination means includes an acquisition unit that is located in the radio base station and acquires the frequency information by receiving a radio signal from a radio station installed in the second area.

(Supplementary Note 6)

The wireless communication control system according to Supplementary note 5, wherein the radio signal contains information on a frequency permitted to be used in the installation location by a second network operator including the second area as a service area.

(Supplementary Note 7)

The wireless communication control system according to any one of Supplementary notes 1 to 6, further including an access control unit that regulates an access from a mobile station to the radio base station, wherein upon accepting an access from a mobile station having a network code for designating the first network operator, the access control unit connects the mobile station to a network of the first network operator, and upon accepting an access from a mobile station having a network code for designating a second network operator including the second area as a service area, the access control unit connects the mobile station to a network of the second network operator.

(Supplementary Note 8)

The wireless communication control system according to any one of Supplementary notes 1 to 6, further including an access control unit that regulates an access from a mobile station to the radio base station, wherein the access control unit transmits, by radio, broadcast information indicating acceptance of an access from a mobile station having a network code for designating the first network operator, as well as an access from a mobile station having a network code for designating another network operator, upon accepting the access from the mobile station having the network code for designating the first network operator, the access control unit connects the mobile station to a network of the first network operator, and upon accepting the access from the mobile station having the network code for designating the another network operator, the access control unit performs signaling for registering the radio base station with a network of the another network operator, and connects the mobile station to the network of the another network operator.

(Supplementary Note 9)

A radio base station that performs wireless communication with a mobile station, including:

judgment means for judging whether an installation location of the radio base station is in a first area corresponding to a service area of a first network operator; and frequency determination means for determining, by using a first procedure, a radio frequency for use in wireless communication with the mobile station when the installation location is in the first area, and for determining the radio frequency by using a second procedure different from the first procedure when the installation location is outside the first area, wherein the second procedure includes:
receiving, from a frequency management system that manages a frequency of a second area being outside the first area and including the installation location, information on a frequency available in the installation location; and determining the radio frequency based on the frequency information.

(Supplementary Note 10)

The radio base station according to Supplementary node 9, wherein the first area is in a predetermined first country, and the second area is in a second country different from the first country.

(Supplementary Note 11)

The radio base station according to Supplementary note 9 or 10, wherein the frequency determination means includes an acquisition unit that acquires the frequency information by signaling with the frequency management system.

(Supplementary Note 12)

The radio base station according to Supplementary note 9 or 10, wherein the frequency determination means includes an acquisition unit that acquires the frequency information by receiving a radio signal from a radio station installed in the second area.

(Supplementary Note 13)

The radio base station according to Supplementary note 12, wherein the radio signal contains information on a frequency permitted to be used in the installation location by a second network operator including the second area as a service area.

(Supplementary Note 14)

The radio base station according to any one of Supplementary notes 9 to 13, further including an access control unit that regulates an access from a mobile station to the radio base station, wherein upon accepting an access from a mobile station having a network code for designating the first network operator, the access control unit connects the mobile station to a network of the first network operator, and upon accepting an access from a mobile station having a network code for designating a second network operator including the second area as a service area, the access control unit connects the mobile station to a network of the second network operator.

(Supplementary Note 15)

The radio base station according to any one of Supplementary notes 9 to 13, further including an access control unit that regulates an access from a mobile station to the radio base station, wherein the access control unit transmits, by radio, broadcast information indicating acceptance of an access from a mobile station having a network code for designating the first network operator, as well as an access from a mobile station having a network code for designating another network operator, upon accepting the access from the mobile station having the network code for designating the first network operator, the access control unit connects the mobile station to a network of the first network operator, and upon accepting the access from the mobile station having the network code for designating the another network operator, the access control unit performs signaling for registering the radio base station with a network of the another network operator, and connects the mobile station to the network of the another network operator.

(Supplementary Note 16)

A frequency determination method for determining a frequency used by a radio base station for wireless communication with a mobile station, the method including:

judging whether an installation location of the radio base station is in a first area corresponding to a service area of a first network operator; and determining, by using a first procedure, a radio frequency for use in wireless communication with the mobile station when the installation location is in the first area, and determining the radio frequency by using a second procedure different from the first procedure when the installation location is outside the first area, wherein the second procedure includes:

receiving, from a frequency management system that manages a frequency of a second area being outside the first area and including the installation location, information on a frequency available in the installation location; and determining the radio frequency based on the frequency information.

(Supplementary Note 17)

A program for causing a computer to execute the frequency determination method according to Supplementary note 16.

REFERENCE SIGNS LIST

10 FEMTOCELL BASE STATION
20 FEMTOCELL
30 MOBILE STATION
40 REGISTERED OPERATOR NETWORK
41 COMMUNICATION CONTROL UNIT
42 BASE STATION MANAGEMENT NODE
50 FREQUENCY MANAGEMENT SYSTEM
51 RADIO STATION
60 INTERNET COMMUNICATION LINE
61 INTERNET
70 LOCAL OPERATOR NETWORK
71 LOCAL OPERATOR NODE
80 VISITOR OPERATOR NETWORK
81 VISITOR OPERATOR NODE
411 LOCATION JUDGMENT UNIT
412 FREQUENCY DETERMINATION UNIT
101 ANTENNA
102 RADIO INTERFACE UNIT
103 BACKHAUL INTERFACE UNIT
104 POSITION DETECTION UNIT
105 INSTALLATION LOCATION JUDGMENT UNIT
106 FREQUENCY INFORMATION ACQUISITION UNIT
107 FREQUENCY DETERMINATION UNIT
108 ACCESS CONTROL UNIT

The invention claimed is:

1. A wireless communication control system, comprising:

a judgment unit located in a radio base station and configured to judge whether an installation location of the radio base station is in a first area corresponding to a service area of a first network operator, the radio base station including a wireless transceiver configured to generate a cell and to perform wireless communication with a mobile station, the radio base station also including a backhaul interface unit configured to communicate with a network of the first network operator; and a frequency determination unit configured to determine, by using a first procedure, a radio frequency used by the radio base station for the wireless communication with the mobile station when it is judged that the installation location is in the first area, and to determine the radio frequency by using a second procedure different from the first procedure when it is judged that the installation location is outside the first area, wherein the second procedure includes:

receiving, from a frequency management system that is located remotely from the radio base station and manages a frequency of a second area being outside the first area and including the installation location, information on a frequency available in the installation location; and determining the radio frequency based on the frequency information.

2. The wireless communication control system according to claim 1, wherein the first area is in a predetermined first country, and the second area is in a second country different from the first country.

3. The wireless communication control system according to claim 1, wherein the frequency determination unit includes an acquisition unit that is located in one of a network of the first network operator and the radio base station and acquires the frequency information by signaling with the frequency management system.

4. The wireless communication control system according to claim 3, wherein the acquisition unit is located in the radio base station and acquires the frequency information through an Internet communication line.

5. The wireless communication control system according to claim 1, wherein the frequency determination unit includes an acquisition unit that is located in the radio base station and acquires the frequency information by receiving a radio signal from a radio station installed in the second area.

6. The wireless communication control system according to claim 5, wherein the radio signal contains information on a frequency permitted to be used in the installation location by a second network operator including the second area as a service area.

7. The wireless communication control system according to claim 1, further comprising an access control unit that regulates an access from the mobile station to the radio base station, wherein upon accepting the access from the mobile station having a network code for designating the first network operator, the access control unit connects the mobile station to a network of the first network operator, and upon accepting the access from the mobile station having the network code for designating a second network operator including the second area as a service area, the access control unit connects the mobile station to a network of the second network operator.

8. The wireless communication control system according to claim 1, further comprising an access control unit that regulates an access from the mobile station to the radio base station, wherein the access control unit transmits, by radio, broadcast information indicating acceptance of the access from the mobile station having a network code for designating the first network operator, as well as an access from a mobile station having a network code for designating another network operator, upon accepting the access from the mobile station having the network code for designating the first network operator, the access control unit connects the mobile station to a network of the first network operator, and upon accepting the access from the mobile station having the network code for designating the another network operator, the access control unit performs signaling for registering the radio base station with a network of the another network operator, and connects the mobile station to the network of the another network operator.

9. A radio base station that performs wireless communication with a mobile station, comprising:

a wireless transceiver configured to generate a cell and to perform wireless communication with the mobile station;

a backhaul interface unit configured to communicate with a network of a first network operator;

a judgment unit configured to judge whether an installation location of the radio base station is in a first area corresponding to a service area of the first network operator; and a frequency determination unit configured to determine, by using a first procedure, a radio frequency used by the radio base station for the wireless communication with the mobile station when it is judged that the installation location is in the first area, and to determine the radio frequency by using a second procedure different from the first procedure when it is judged that the installation location is outside the first area, wherein the second procedure includes:

receiving, from a frequency management system that is located remotely from the radio base station and manages a frequency of a second area being outside the first area and including the installation location, information on a frequency available in the installation location; and determining the radio frequency based on the frequency information.

10. The radio base station according to claim 9, further comprising an access control unit that regulates an access from the mobile station to the radio base station, wherein upon accepting the access from the mobile station having a network code for designating the first network operator, the access control unit connects the mobile station to a network of the first network operator, and upon accepting the access from the mobile station having the network code for designating a second network operator including the second area as a service area, the access control unit connects the mobile station to a network of the second network operator.

11. The radio base station according to claim 9, further comprising an access control unit that regulates an access from the mobile station to the radio base station, wherein the access control unit transmits, by radio, broadcast information indicating acceptance of the access from the mobile station having a network code for designating the first network operator, as well as an access of a mobile station having a network code for designating another network operator, upon accepting the access from the mobile station having the network code for designating the first network operator, the access control unit connects the mobile station to a network of the first network operator, and upon accepting the access from the mobile station having the network code for designating the another network operator, the access control unit performs signaling for registering the radio base station with a network of the another network operator, and connects the mobile station to the network of the another network operator.

12. The radio base station according to claim 9, wherein the first area is in a predetermined first country, and the second area is in a second country different from the first country.

13. The radio base station according to claim 9, wherein the frequency determination unit includes an acquisition unit that acquires the frequency information by signaling with the frequency management system.

14. The radio base station according to claim 9, wherein the frequency determination unit includes an acquisition unit that acquires the frequency information by receiving a radio signal from a radio station installed in the second area.

15. The radio base station according to claim 14, wherein the radio signal contains information on a frequency permitted to be used in the installation location by a second network operator including the second area as a service area.

16. A frequency determination method, comprising:
   judging, by a radio base station, whether an installation location of the radio base station is in a first area corresponding to a service area of a first network operator, wherein the radio base station includes a wireless transceiver configured to generate a cell and to perform wireless communication with a mobile station and also includes a backhaul interface unit configured to communicate with a network of the first network operator; and
   determining, by using a first procedure, a radio frequency used by the radio base station for the wireless communication with the mobile station when it is judged that the installation location is in the first area, and determining the radio frequency by using a second procedure different from the first procedure when it is judged that the installation location is outside the first area,
   wherein the second procedure includes:
   receiving, from a frequency management system that is located remotely from the radio base station and manages a frequency of a second area being outside the first area and including the installation location, information on a frequency available in the installation location; and
   determining the radio frequency based on the frequency information.

17. The frequency determination method according to claim 16, wherein the first area is in a predetermined first country, and the second area is in a second country different from the first country.

18. The frequency determination method according to claim 16, wherein the determining includes acquiring the frequency information by receiving a radio signal from a radio station installed in the second area.

19. The frequency determination method according to claim 16, further comprising:
   upon accepting an access from a mobile station having a network code for designating the first network operator, connecting the mobile station to a network of the first network operator, and
   upon accepting an access from the mobile station having the network code for designating a second network operator including the second area as a service area, connecting the mobile station to a network of the second network operator.

20. The frequency determination method according to claim 16, further comprising:
   transmitting, by radio, broadcast information indicating acceptance of the access from the mobile station having a network code for designating the first network operator, as well as an access of a mobile station having a network code for designating another network operator,
   upon accepting the access from the mobile station having the network code for designating the first network operator, connecting the mobile station to a network of the first network operator, and
   upon accepting the access from the mobile station having the network code for designating the another network operator, performing signaling for registering the radio base station with a network of the another network operator, and connecting the mobile station to the network of the another network operator.

* * * * *